United States Patent [19]
Jensen

[11] 3,799,735
[45] Mar. 26, 1974

[54] CONVEYOR FLIGHTS FOR ROTARY KILN

[75] Inventor: Flemming E. Jensen, Copenhagen-Valby, Denmark

[73] Assignee: F. L. Smidth & Co., Cresskill, N.J.

[22] Filed: Jan. 5, 1972

[21] Appl. No.: 215,474

[52] U.S. Cl. .................................. 432/16, 432/103
[51] Int. Cl. ............................................... F27b 7/14
[58] Field of Search ............ 263/33, 32; 432/14, 16, 432/103, 105, 106

[56] References Cited
UNITED STATES PATENTS

| | | | |
|---|---|---|---|
| 3,306,237 | 2/1967 | Ransom, Jr. | 263/32 R |
| 2,549,787 | 4/1951 | Dube | 263/33 R |
| 1,636,467 | 7/1927 | Evans | 263/33 R |
| 3,641,683 | 2/1972 | Preeman | 263/33 R |
| 2,965,366 | 12/1960 | O'Mara et al. | 263/32 R |
| 3,603,569 | 12/1969 | Abboud et al. | 263/32 |

*Primary Examiner*—John J. Camby
*Attorney, Agent, or Firm*—Pennie & Edmonds

[57] ABSTRACT

A method for producing heat exchange between particles of raw materials and hot combustion gases in an inclined rotary kiln is disclosed. The kiln includes trough-shaped conveyor flights constructed to discharge the particles over the length of the kiln in the form of clouds of substantially parallel vertical curtains extending across the kiln at an acute angle to the axis of the kiln. The kiln can be used in a plant including means for collecting and returning the material carried out of the kiln.

11 Claims, 6 Drawing Figures

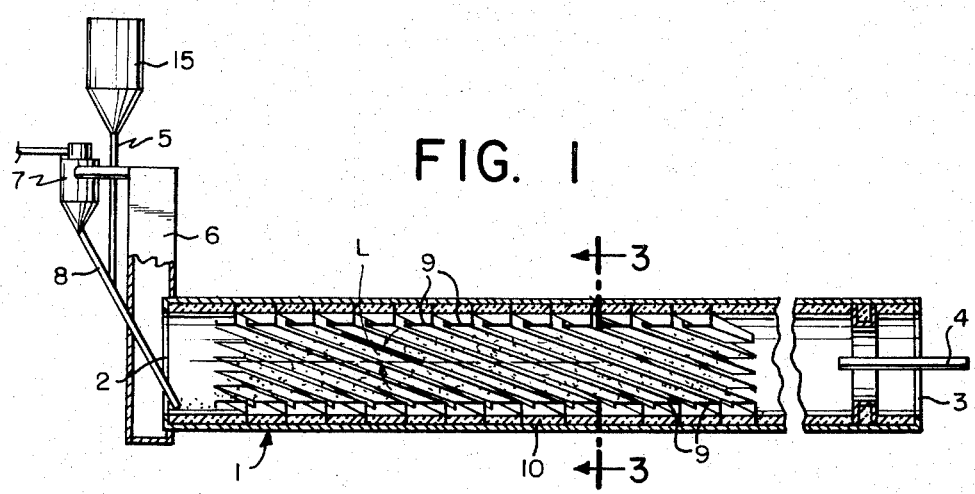
FIG. 1
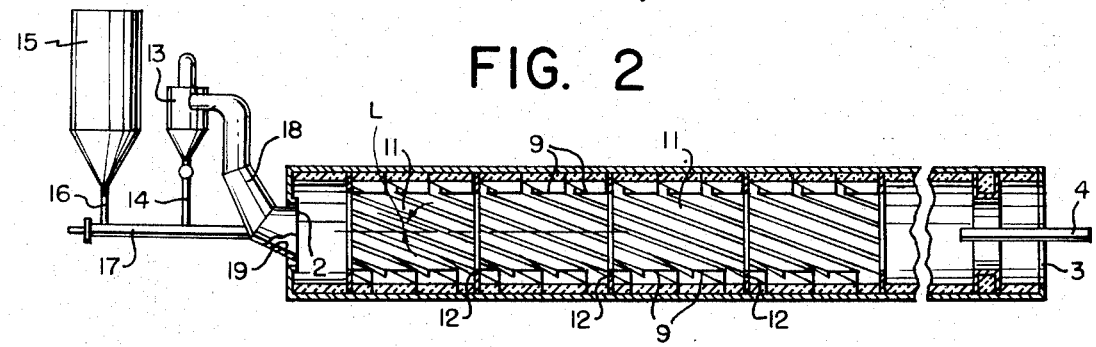
FIG. 2
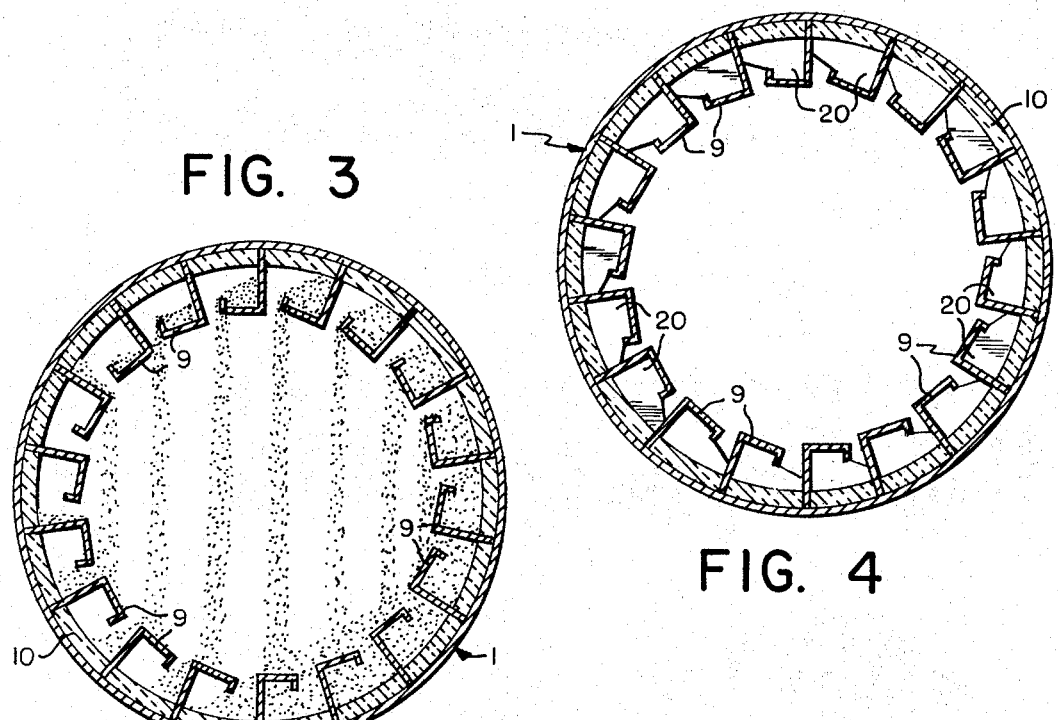
FIG. 3
FIG. 4

3,799,735

CONVEYOR FLIGHTS FOR ROTARY KILN

BACKGROUND OF THE DISCLOSURE

In various processes heat exchange is brought about between particles of raw material and hot combustion gases in an inclined rotary kiln. The raw material is introduced at one end of the kiln and flows in countercurrent to the hot gases of combustion of fuel burnt at the other end of the kiln.

The best known of such processes is the production of cement, in which there are three recognized stages, namely preheating, calcining and burning, carried out at increasing temperature, the burning being effected in a hot zone. To carry out all these stages commonly necessitates a very long kiln. In recent years separate preheaters have been provided, the raw material being brought into contact with the hot kiln gases in the preheater, and thus entering the kiln in a preheated state. However, although the length of the kiln can be reduced by the provision of a separate preheater, the kiln plant is complicated and its cost increased very considerably by the preheater.

Several methods and apparatus for effecting heat exchange between particles of raw material and hot gases have been suggested. For example, U.S. Pat. Nos. 743,538, 1,977,767, 2,039,645, 2,084,713, 2,319,548, 2,549,787, 2,715,283, 2,750,182, 3,395,906 and French Pat. No. 1,515,559 are illustrative of some of these known methods and apparatus.

It is clearly desirable to effect the preheating in the kiln and yet keep it comparatively short. It is the object of this invention to provide an improved way of accomplishing this.

SUMMARY OF THE INVENTION

According to the invention the particles of the raw material in their passage down the kiln on their way to the hot zone are alternately lifted and dropped again to form clouds, preferably in the form of substantially parallel vertical curtains extending across the kiln at an acute angle to the axis of the kiln, the clouds being of such density that the gases on entering a cloud or curtain are relieved of some suspended particles which drop with the particles in the curtain, but on the other hand entrain particles from the curtain so that on leaving the curtain the gases are supersaturated with particles and consequently particles are again precipitated from them, some before the gases reach the next curtain and others into this curtain, while still others pass with the gases through this curtain. The particles suspended in the gases leaving the last curtain are separated and returned to the kiln.

The fact that the curtains make an acute angle with the kiln axis is important. If they were parallel to the kiln axis the hot gases would essentially sweep past them without penetrating them.

It is also important to ensure that the curtains are so dense as to cause the gases passing through them to become supersaturated in particles.

Once a state of equilibrium is established, there is constant movement of the material down the kiln with effective preheating in the kiln.

The invention is particularly applicable to processes in which cement raw material is burnt to clinker, the raw meal being formed into the transverse curtains while being preheated and calcined. When cement raw meal is calcined or partly calcined and drops out of the gases, it is in so aerated a condition that it flows very much like a liquid, and if allowed will rush down the kiln. Accordingly, it is important to check its movement several times in the preheating and calcining zones of the kiln.

To enable the invention to be carried out the kiln must of course be specifically constructed. The invention includes novel kilns in which trough-shaped conveyor flights extend helically along the inner wall from the upper end over a length at least equal to five times the internal diameter of the kiln and are constructed so as to aim at a discharge of material over substantially the whole cross-section of the kiln as parallel vertical curtains at an acute angle to the axis of the kiln.

When these flights pick up material it is of course in the aerated state, and so tends to flow rapidly along them, and in fact the flights act much as a screw conveyor in conveying and guiding the material in them. Accordingly, if the raw material is cement raw meal, barriers are provided to stop the flow along some or all of the flights. These barriers are most required in the calcining zone in a cement kiln.

If the raw material is so aerated as to behave like a liquid, it is desirable also to check its flow along the bottom of the kiln. Accordingly, dam rings may advantageously be provided in the zone in which the transverse curtains are formed to check the flow of the material along both the bottom of the kiln and the flights.

Preferably the flights form an angle of between 15° and 25° with the generatrix of the kiln tube; the angle chosen will also, of course, be that which the parallel curtains make with the kiln axis.

The invention further includes rotary kiln plants comprising both a rotary kiln and means for collecting and returning the material carried out of the kiln. Preferably a single cyclone is provided to receive all the gases from the kiln and the material carried by them, and most conveniently the material outlet of the cyclone is directly connected to a feed pipe for the raw material. As is well known, hot kiln gases after passing through any cyclone normally also flow through an electrostatic dust precipitator, in order that they may pass into the atmosphere with no more than the permitted amount of dust. Therefore, normally an electrostatic precipitator is also provided in a plant according to the invention, together with means for returning the dust precipitated in this to the kiln.

The raw material and the material collected from the hot gases may most advantageously be introduced into a riser pipe connecting the kiln to the cyclone. This pipe may be constructed so that its bottom slopes towards the inlet end of the kiln, with the result that all the materials entering the kiln slides down this sloping surface into the kiln.

BRIEF DESCRIPTION OF THE DRAWINGS

Two kilns according to the invention will now be described by way of example, with reference to the drawings in which:

FIG. 1 is a longitudinal section through one kiln;

FIG. 2 is a longitudinal section through a modified construction of a kiln;

FIG. 3 is a section taken along line III—III of FIG. 1;

FIG. 4 is a section of FIG. 1 at a different point in the kiln;

DESCRIPTION OF THE PREFERRED EMBODIMENTS

Figure 5:
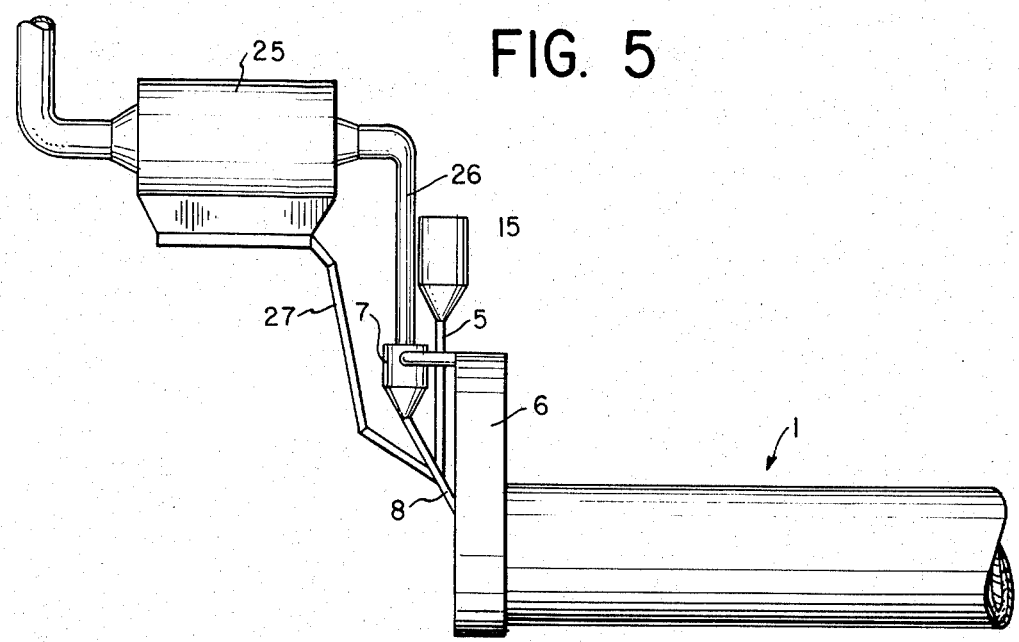
FIG. 5 is a view of the left portion of the kiln shown in FIG. 1 illustrating the use of an electrostatic precipitator.

Referring first to FIG. 1, a rotary kiln 1 with an inlet end 2 and an outlet end 3 is shown, the kiln in operation being slightly inclined from the inlet to the outlet end. A conventional burner tube is indicated at 4, and the raw material is introduced through a feed pipe 5 from a silo 15. The hot gases leave the kiln through the material-inlet end 2, passing through a riser pipe 6 to a cyclone 7, from the bottom of which a pipe 8 runs to meet the pipe 5.

Trough-shaped conveyor flights 9 are provided over a substantial length of the material-inlet end of the kiln. These flights must of course be made of heat-resistant metal, and the distance through which they can extend down the kiln is limited by the temperature within the kiln, which is highest in the burning zone close to the burner tube 4 and decreases towards the material-inlet end. Their roots may advantageously be embedded in the conventional refractory lining 10 of the kiln.

As the kiln rotates, the conveyor flights pick up material and drop it again as vertical curtains at an acute angle L illustrated in FIGS. 1 and 2 to the kiln axis which is the same as that of the lines indicating the flights 9 in FIG. 1. These curtains are shown in FIG. 3, and it will be understood that each extends across substantially the whole cross-sction of the kiln, so that the gases pass through each curtain in turn. To ensure that the curtains are as dense as is required, the flights 9 must be of such size, cross-section and pitch as to pick up substantial amounts of material.

In the kiln shown in FIG. 1, the passage of the material down the conveyor flights is stopped at intervals by barriers in the form of plates 20 shown in FIG. 4 but not in FIG. 1. Wherever there is a plate 20, the material in the flights is prevented from passing further downwards and accordingly is forced to form part of a transverse curtain.

In FIG. 5 there is shown an electrostatic precipitator 25 having an inlet 26 and an outlet 27 connected to the kiln shown in FIG. 1. The inlet 26 is connected to cyclone 7 while the outlet 27 is connected to the pipe 8 as shown. The precipitator 25 precipitates the dust and returns it to the kiln 1.

In the modified kiln shown in FIG. 2 barriers to the flow of the aerated material down the flights and the bottom of the kiln are formed by dam rings 12, which divide the inlet end of the kiln into sections 11.

FIG. 2 also shows a different arrangement of the apparatus at the inlet end of the kiln, this arrangement being equally suitable for use in a kiln with plates 20 of the kind shown in FIG. 1 rather than dam rings 12. As shown in FIG. 2, an inclined riser pipe 18 leads to a cyclone 13 and has a bottom sloping surface 19. The raw material from a silo 15 falls through a pipe 16 into a screw conveyor 17, into which a pipe 14 running from the bottom of the cyclone 13 also discharges.

Of course there will be some heat exchange between the material and the hot gases while these flow through the riser pipes 6 and 18, so not all the preheating is effected in the kiln. However, the invention allows the omission of any separate preheater plant. At the same time, the preheating and calcining stages are performed in so short a length of the kiln as to enable the whole kiln to be comparatively short.

To avoid too much material being carried out of the kiln and having to be returned again, chains or other devices well known in the industry for trapping material may be provided at the inlet end 2 of each of the kilns shown.

Figure 6:
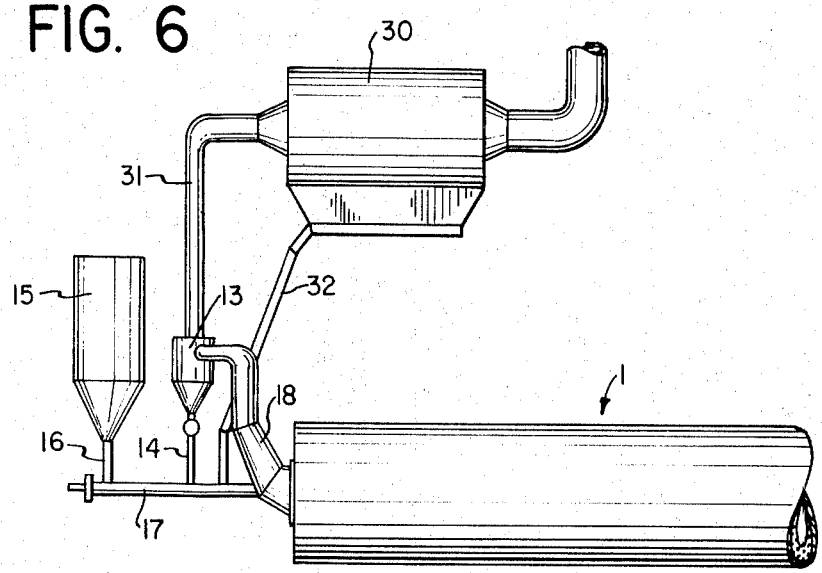
FIG. 6 is a view of the left portion of the kiln shown in FIG. 2 illustrating the use of an electrostatic precipitator.

In FIG. 6 there is shown an electrostatic precipitator 30 having an inlet 31 connected to cyclone 13 with on outlet 32 connected to screw conveyor 17. The precipitator 30 is thus connected in a manner to precipitate dust and return it to the kiln 1.

I claim:

1. A method for producing heat exchange between particles of raw materials and hot combustion gases in an inclined rotary kiln comprising the steps of moving said particles down the kiln toward the hot zone thereof, alternately lifting and dropping said particles during their passage down the kiln to produce clouds of falling particles in the form of substantially parallel vertical curtains each extending across the kiln at an acute angle to the axis of the kiln to cover substantially the total cross-sectional area of the kiln and each having a sufficient density to relieve gases entering said curtains of suspended particles and to entrain new particles from the curtains to form gases supersaturated with particles, before reaching and during through the next curtain precipitating particles from the supersaturated gases, separating the particles suspended in the gases leaving the last curtain; and returning the particles separated from the last curtain to said kiln.

2. A method according to claim 1 in which the material is cement raw meal which is formed into the transverse curtains while being preheated and calcined.

3. A method according to claim 2 in which the free flow of the material down the bottom of the kiln is checked several times in the preheating and calcining zones of the kiln.

4. A rotary kiln for producing heat exchange between particles of raw materials and combustion gases, said kiln comprising a plurality of trough-shaped conveyor flights extending helically along the inner wall of the kiln from the upper end over a length of the kiln at least equal to five times the internal diameter of the kiln, said conveyor flights being constructed to contain, lift and discharge sufficient amounts of material to produce clouds of falling particles in the form of substantially parallel vertical curtains each extending across the kiln at an acute angle to the axis of the kiln to cover substantially the total cross-sectional area of the kiln.

5. A rotary kiln according to claim 4 including barriers, said barriers provided to stop the flow along some or all of the flights.

6. A rotary kiln according to claim 5 in which dam rings are provided in the zone in which the transverse curtains are formed to check the flow of the material along both the bottom of the kiln and the flights.

7. A rotary kiln according to claim 4 in which the flights form an angle of between 15° and 25° with the generatrix of the kiln tube.

8. A rotary kiln plant according to claim 4 further including means for collecting and returning material carried out of the kiln.

9. A rotary kiln plant according to claim 8 in which a single cyclone is provided to receive all the gases from the kiln and the material carried by them, and the material outlet of the cyclone is directly connected to a feed pipe for the raw material.

10. A rotary kiln plant according to claim 9 including an electrostatic precipitator and means for returning the dust precipitated to the kiln.

11. A rotary kiln plant according to claim 9 including means for introducing raw material collected from the hot gases into a riser pipe connecting the kiln to the cyclone.

* * * * *

UNITED STATES PATENT OFFICE
CERTIFICATE OF CORRECTION

Patent No. 3,799,735      Dated March 26, 1974

Inventor(s) Flemming E. Jensen

It is certified that error appears in the above-identified patent and that said Letters Patent are hereby corrected as shown below:

1. In column 1, line 6, "materiad" should read --material--.

2. In column 3, line 30, the expression "illustrated in FIGS. 1 and 2" should be enclosed in parentheses ( ).

3. In column 4, line 12, the last word "on" should read --an--.

4. In column 4, line 30, after "during" and before "through", insert the word --passage--.

Signed and sealed this 17th day of September 1974.

(SEAL)
Attest:

McCOY M. GIBSON JR.            C. MARSHALL DANN
Attesting Officer              Commissioner of Patents